(12) United States Patent
Lowry

(10) Patent No.: US 10,353,648 B1
(45) Date of Patent: Jul. 16, 2019

(54) METHOD AND APPARATUS FOR PRODUCTION OF A VINYL FILM PRODUCT

(71) Applicant: Brand Ink, LLC, St Paul, MN (US)

(72) Inventor: Nicholas Lowry, Minneapolis, MN (US)

(73) Assignee: Brand Ink, LLC, St. Paul, MN (US)

( * ) Notice: Subject to any disclaimer, the term of this patent is extended or adjusted under 35 U.S.C. 154(b) by 0 days.

(21) Appl. No.: 15/989,966

(22) Filed: May 25, 2018

(51) Int. Cl.
| | | |
|---|---|---|
| *G06F 3/12* | (2006.01) |
| *H04N 1/00* | (2006.01) |
| *G06Q 10/06* | (2012.01) |
| *B32B 41/00* | (2006.01) |
| *B41M 5/00* | (2006.01) |
| *B32B 27/08* | (2006.01) |
| *B32B 27/30* | (2006.01) |
| *B32B 37/20* | (2006.01) |
| *B32B 38/00* | (2006.01) |
| *G06Q 30/00* | (2012.01) |

(52) U.S. Cl.
CPC ............ *G06F 3/1219* (2013.01); *B32B 27/08* (2013.01); *B32B 27/30* (2013.01); *B32B 37/203* (2013.01); *B32B 38/145* (2013.01); *B32B 41/00* (2013.01); *B41M 5/0064* (2013.01); *G06F 3/1232* (2013.01); *G06F 3/1241* (2013.01); *G06Q 10/06313* (2013.01); *G06Q 30/012* (2013.01); *H04N 1/00665* (2013.01)

(58) Field of Classification Search
CPC .... G06F 3/1219; G06F 3/1241; G06F 3/1232; B32B 41/00; B32B 37/203; B32B 276/30; G06Q 30/012; H04N 1/00665
USPC ......................................................... 358/1.15
See application file for complete search history.

(56) References Cited

U.S. PATENT DOCUMENTS

| | | | | |
|---|---|---|---|---|
| 2005/0242570 | A1* | 11/2005 | Gecha | B42D 15/0053 283/98 |
| 2006/0233995 | A1* | 10/2006 | Garland | B31D 1/021 428/41.8 |
| 2006/0260754 | A1* | 11/2006 | Crum | B31D 1/021 156/387 |
| 2006/0263561 | A1* | 11/2006 | Kraft | B31D 1/021 428/40.1 |
| 2012/0288312 | A1* | 11/2012 | Seki | B41J 3/4075 400/76 |

* cited by examiner

*Primary Examiner* — Saeid Ebrahimi Dehkordy
(74) *Attorney, Agent, or Firm* — Schwegman Lundberg & Woessner, P.A.

(57) ABSTRACT

Apparatus and method disclosed herein are used in a production facility including an inventory of base substrates and laminates used in the production of graphics, the production facility further including at least one printer and at least one laminating machine. Base substrates, such as adhesive backed vinyl films, and laminates are received at the facility and labeled to be identified in a production process. Project data stored in a data storage system, and data concerning the substrates and laminates, is used by a production control system to control the process of printing graphic images on the substrate, and laminate the substrate.

20 Claims, 20 Drawing Sheets

FIG. 2

| | PRINTER | MATERIAL | FT | | 672 | | 674 | | | | |
|---|---|---|---|---|---|---|---|---|---|---|---|
| SWAP | MIMAKI JV33 | CLING | 45 | UPDATE | | | | | | | |
| | HP L26500 | IJ35C-10 | 92.9 | UPDATE | | READY TO PRINT | READY TO LAMINATE | READY TO CUT | READY TO FINISH | OPEN ORDERS | |
| | HP L370 | IJ180MC-114 | 23.9 | UPDATE | | START NEW BATCH | —679 | | | | |
| | EPSON S80600 | 1080-G363 | 16 | UPDATE | | | | | | MENU | |

670

| 676 | MATERIAL | | LAMINATE | | ORDERED | PRINTED | REMAINING TO PRINT | | | | |
|---|---|---|---|---|---|---|---|---|---|---|---|
| | 40C | IN STOCK | 8510 | 16.5 FT. X 5.2 FT. DIBON LAR... UNIVER... | 2 | 1 | 1 | 4/12/2018 5:22:59 | IJ35C-10 | 8510 | PRINTING |
| 678 | IJ180MC-114 | IN STOCK | 8518 | 15 IN. X 4.3 IN. SCIENCE APP... ABRASI... | 876 | 850 | 26 | 5/1/2018 11:52:39 | IJ180MC-114 | | PRINTING |
| | IJ35C-10 | IN STOCK | 8510 | 3 FT. X 8 FT. DIBOND MEWS... UNIVER... | 3 | | 3 | | | | PRINTING |
| | IJ35C-10 | IN STOCK | 8510 | 45.5 IN. X 37.125 IN. SINTRA... ABC OP... | 1 | | 1 | | | | PRINTING |
| | IJ3730 | IN STOCK | 8520 | 36 IN. X 18 IN. READING RAI... UNIVER... | 5 | | 5 | | | | PRINTING |
| | IJ3730 | IN STOCK | 8520 | 12 IN. X 18 IN. READING RAI... UNIVER... | 5 | | 5 | | | | PRINTING |
| | IJ8150 | IN STOCK | NONE | READING RAIL 2ND LAYER... UNIVER... | 5 | | 5 | | | | PRINTING |
| | IJ8150 | IN STOCK | NONE | READING RAIL 2ND LAYER... UNIVER... | 5 | | 5 | | | | PRINTING |
| | PACIFICA | IN STOCK | NONE | 36 IN. X 24 IN. MATTE PHOT... STUDIO | 1 | | 1 | | | | PRINTING |

*FIG. 6A*

SELECT ITEMS TO PRINT

| | MATERIAL | | LAMINATE | | | ORDERED | PRINTED | REMAINING TO PRINT | GOING TO PRINT | |
|---|---|---|---|---|---|---|---|---|---|---|
| SELECT | 40C | IN STOCK | 8510 | 16.5 FT. X 5.2 FT. DIBON LAR... | UNIVER... | 2 | 1 | 1 | | PRINTING |
| SELECT | IJ80MC-114 | IN STOCK | 8518 | 15 IN. X 4.3 IN. SCIENCE APP... | ABRASI... | 876 | 850 | 26 | | PRINTING |
| SELECT | IJ35C-10 | IN STOCK | 8510 | 3 FT. X 8 FT. DIBOND MEWS... | UNIVER... | 3 | | 3 | 3 | PRINTING |
| SELECT | IJ35C-10 | IN STOCK | 8510 | 45.5 IN. X 37.125 IN. SINTRA... | ABC OP... | 1 | | 1 | 1 | PRINTING |
| SELECT | IJ3730 | IN STOCK | 8520 | 36 IN. X 18 IN. READING RAI... | UNIVER... | 5 | | 5 | | PRINTING |
| SELECT | IJ3730 | IN STOCK | 8520 | 12 IN. X 18 IN. READING RAI... | UNIVER... | 5 | | 5 | | PRINTING |
| SELECT | IJ8150 | IN STOCK | NONE | READING RAIL 2ND LAYER... | UNIVER... | 5 | | 5 | | PRINTING |
| SELECT | IJ8150 | IN STOCK | NONE | READING RAIL 2ND LAYER... | UNIVER... | 5 | | 5 | | PRINTING |
| SELECT | PACIFICA | IN STOCK | NONE | 36 IN. X 24 IN. MATTE PHOT... | UNIVER... | 1 | | 1 | | PRINTING |

MENU
CONTINUE

*FIG. 6B*

| | | | | | | | | | | RETURNED | RECEIVED | MFG |
|---|---|---|---|---|---|---|---|---|---|---|---|---|
| ID | MATERIAL | PRODUCT | WIDTH | LENGTH | BOXED? | LOCATION | LOADED | NOTES | MIA AS OF | ON | ON | DATE |
| GOTO 2167 | ULTRAFLEX | JETFLEX 13OZ | 63 | | 6 | OPEN | | | | | 10/27/2012 | |

INVENTORY - PRINT MEDIA | READY TO PRINT | PRINT ROLLS | LAMINATE | MENU

METHOD AND APPARATUS FOR PRODUCTION OF A VINYL FILM PRODUCT

BACKGROUND

Adhesive-backed vinyl films, alternately referred to as graphics, have become increasingly popular for applying graphic images to a variety of surfaces such as the surfaces of vehicles, walls, floors, support columns, other structures, and objects in general. These graphic images may include messages, signs and other graphic elements, and are printed on one side of the film, with the other side of the film being coated with a pressure-sensitive adhesive that allows the film to be attached to a surface, typically without damaging or altering the surface, even when the film is removed. These films can also be laminated to provide additional protection for the graphic images printed on the film, and also provide additional structural strength to the film. A particularly popular use of graphics is for applying graphic designs to vehicles. These graphics are commonly referred to as vehicle vinyl wraps, and when applied to the vehicle, they may completely or partially cover a vehicle's original paint with a vinyl wrap of a different color, and sometimes the same color with a differing finish like a gloss, matte or protective layer. Other terms used to refer to a vehicle vinyl wrap are car wrap, paint wrap, color change wrap, and vehicle graphics.

The production of graphics involves a number of input products and process steps that, due to the complexity of their combinations, often result in underutilization of production resources such as printers and laminating machines, excess waste of input materials such as film substrates, inks and laminates, and costly delays in producing technically accurate, durable, and warrantable products.

The method and apparatus disclosed herein provide for solving the technical problems involved in producing graphics in general, and in producing vinyl wraps in particular.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

FIG. 2 illustrates an example application of a graphic according to an example embodiment.

FIGS. 6A, 6B and 6C illustrate order processing screens in an interactive user-interface according to an example embodiment.

FIGS. 7A-7J illustrates a flowchart of a production method and corresponding computer operation, according to an example embodiment.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Figure 1:
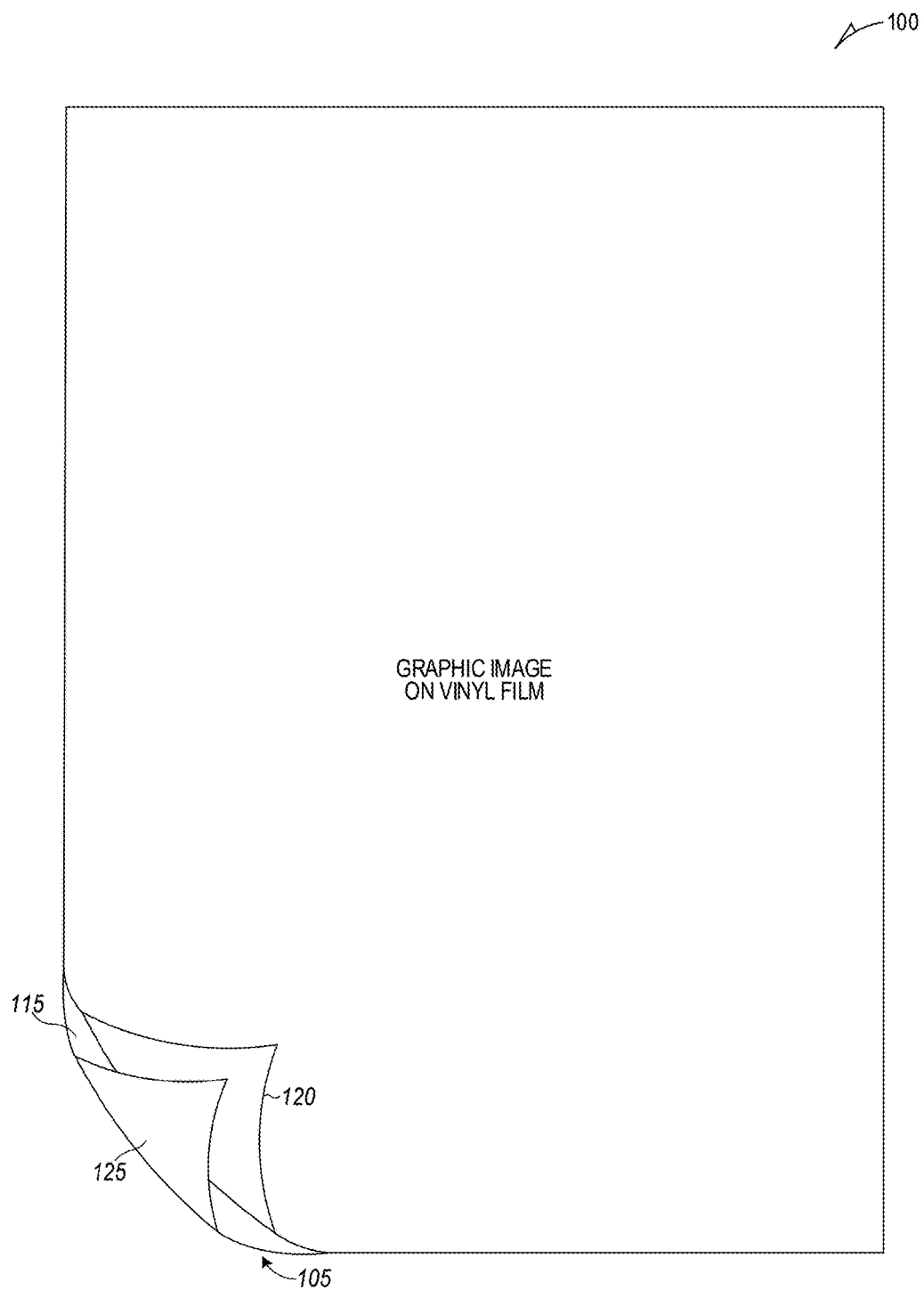
FIG. 1 illustrates an example graphic according to an example embodiment.

Referring now to FIG. 1 there is illustrated an example of a graphic 100 comprised of a vinyl film 105, alternately referred to herein as a "base substrate" or "substrate", with a graphic image 110 printed on a first side 115. The film, in one example embodiment, is laminated with a laminate 120 to provide additional strength and protection for the film. The graphic image 110 is printed on one side of film, and covered with the laminate 120, typically a transparent membrane, while the back side 125 of film 105 is coated or covered with an adhesive, for example a pressure sensitive adhesive. As illustrated in FIG. 2, the adhesive allows the laminated film to be adhered to a surface, such as the surface of a vehicle 200, a structure, such as a wall 205 or floor 210, or to any other surface that is suitable to adhere to a pressure sensitive adhesive. Vinyl films and laminates are most commonly sold in rolls, in various widths and lengths, with a typical width being 54-60 inches, and common lengths being 75, 150 and 300 feet.

The production of graphic begins with the design of the graphic using a graphic design computer program or package. The collection of the computer files and data created using this computer program is referred to as a "graphic project", includes one or more of the following elements: 1) one or more digital files specifying one or more parts that will be separately printed on one or more different substrates (e.g., vinyl films); 2) data including specifications for the type of ink to be used to print the project; (this may or may not be specified by the order, but tracked by the system for what the production manager chooses) 3) data specifying the substrate product to be used to print the parts and at least some characteristics of the product; 4) data specifying the laminate product to laminate the parts; 5) data indicating an entity for whom the graphic project is being printed; and (6) project deadlines. The digital files and data specified above are stored in and accessed from a data storage system, as described below. According to a further example embodiment, the graphic images 110 are created and/or modified using a software package installed on a design workstation, such as the Adobe Creative Cloud (includes both Photoshop and Illustrator) package. More specifically, the software package allows a designer to create and edit a graphic project to produce the files necessary to print a graphic image 110 onto the base substrate 105.

Figure 3:
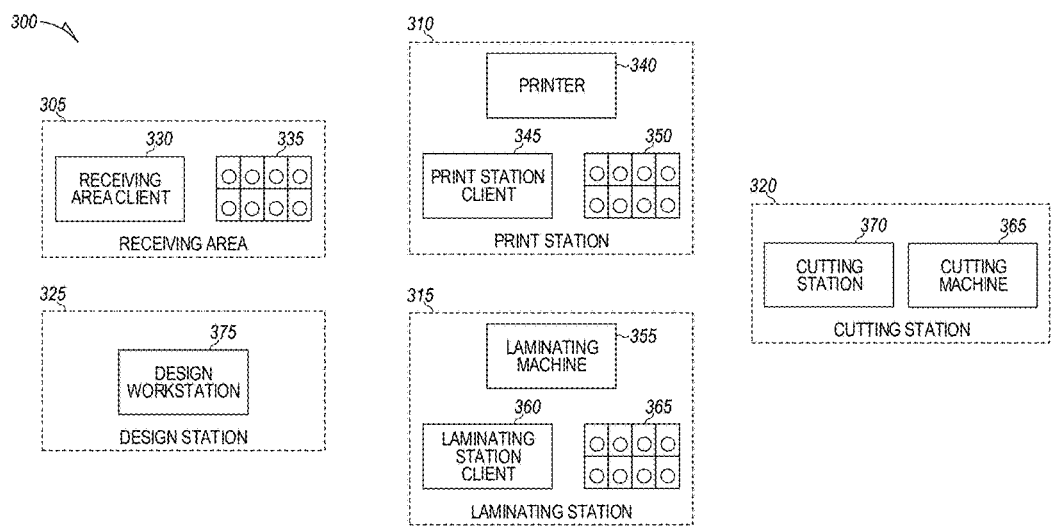
FIG. 3 illustrates a production facility according to an example embodiment.

Referring now to FIG. 3, there is illustrated a production facility to produce a graphic including a laminated base substrate, such as a vinyl film 105, with printed graphic image 110. The production facility, in one example embodiment, includes a production floor 300 including a receiving area 305, one or more print stations 310 for printing a graphic image 110 on substrates, one or more laminating stations 315 for applying a laminate to a substrate, and optionally one or more cutting stations 320 for cutting laminated substrates into desired shapes. The production facility also optionally includes, in one embodiment, one or more design stations 325, used to create or modify graphic projects. The receiving area 305 includes a receiving area client 330 and an inventory storage area 335. The print stations 310 each include a printer 340, a print station client 345, and an adjacent storage area 350. The laminating stations 315 each include a laminating machine 355, a laminating station client 360, and an adjacent storage area. The cutting stations 320, if provided, may include an electronic cutting machine 365 and a cutting station client 370. The design stations 325 each include a design workstation 375.

Figure 4A:
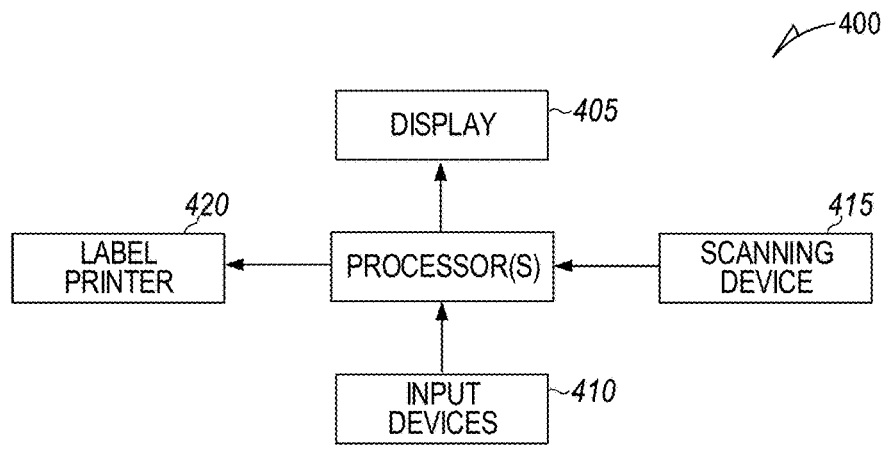
FIG. 4A illustrates a client according to an example embodiment.

Illustrated in FIG. 4A is an example embodiment of a client (i.e. clients 330, 345, 360, 370) provided at one of the stations illustrated in FIG. 3. Each client 400 includes a display 405, and one or more input devices 410, such as a mouse, a keyboard, a touch-screen or voice recognition capabilities. Also, at least at stations 330, 345 and 360, a scanning device 415 to read a machine-readable component such as bar code or RFID tag. The clients 330 and 345 at receiving area 305 and print station 310, respectively, further include a label printer 420, operatively connected to the respectively client or a server 505 (described in more detail below) to print labels forming a unique identifier 430 that is attached to a base substrate or laminate received into inventory or a printed substrate output from a printer 340. According to another example embodiment, the scanning device 415 is a bar code scanner, or alternately may be an RFID reader, or any other device that can read a machine-readable element. According to another embodiment, the workstation 375 and clients 330, 345, 360 and 370 each include one or more processors, and may be, but are not limited to, a tablet, laptop, multi-processor system, smartphone, or any other device that a user utilizes to communicate over a network. In some examples, the client 400 may lack physical input mechanisms beyond a touchscreen. Accordingly, the primary interfaces for a user may be gesture-based touch controls or audio input.

Figure 4B:
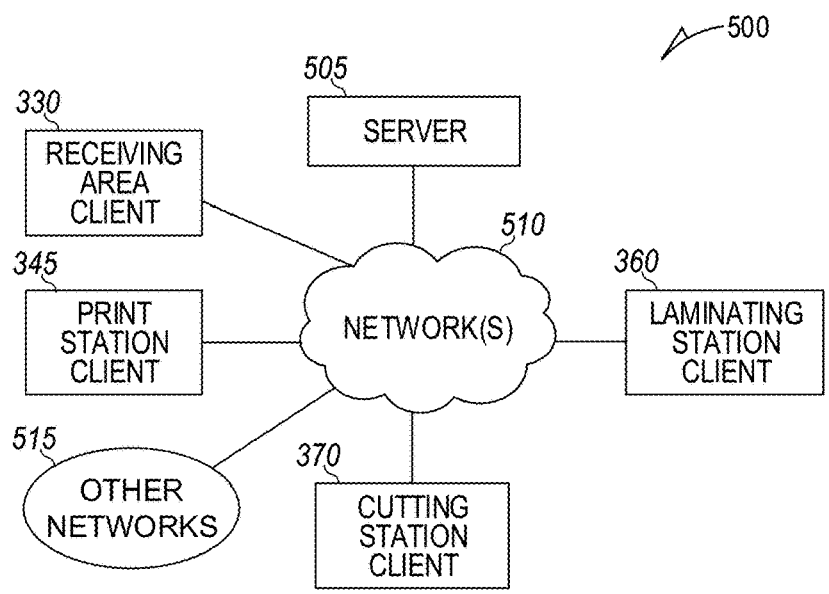
FIG. 4B illustrates a production control system according to an example embodiment.

Referring now to FIG. 4B, there is illustrated a production control system ("PCS") 500 that provides for controlling the production of graphic projects to produce graphics in specified shapes with a specified graphic image 110. The PCS 500, described in more detail below, includes a server 505, the receiving area client 330, the print station client(s) 345, laminating station client(s) 360, and/or cutting station client(s) 370, described above. The server 505 and clients 330 345, 360 and 370, are collectively referred to herein, in some instances, as the PCS 500, and are connected by a network 510, which in turn in one example embodiment, is attached to a further network 515, such as described further below. For example, a reference to entering data into the PCS 500 means the data can be input directly to the server 505, or through one of the above referred-to clients, and the software and database components of the PCS 500 can be distributed between the server 505 and clients in any way that supports the operation of the PCS 500 to perform the functions herein described.

Figure 4C:
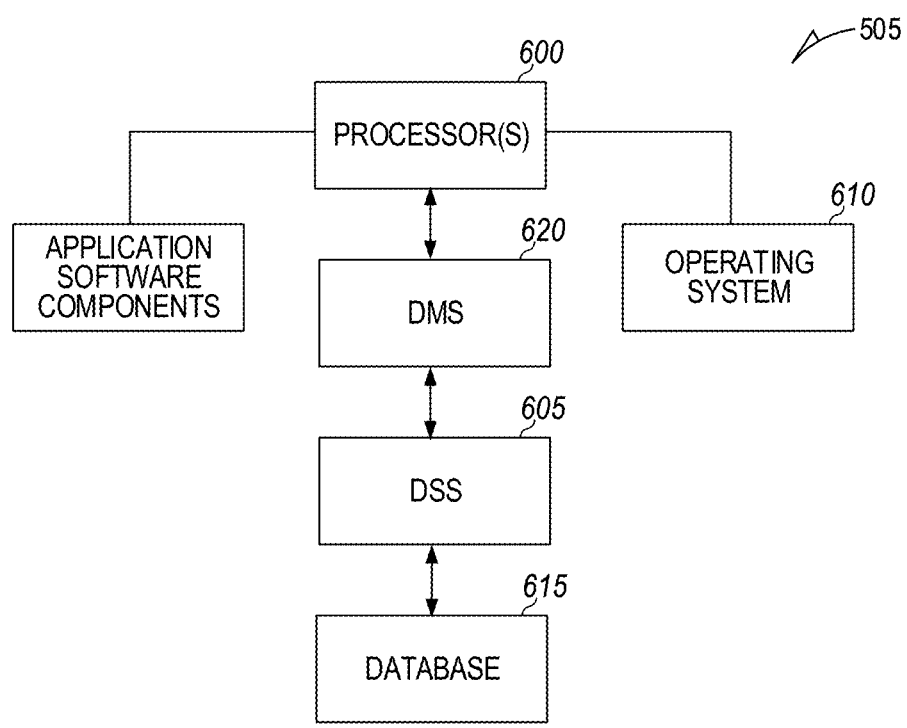
FIG. 4C illustrates a server according to an example embodiment.

According to one example embodiment illustrated in FIG. 4C, the server 505 includes one or more processors 600, a data storage system ("DSS") 605, an operating system 610, a database 615, a database management system ("DMS") 620, and application software components 625, to perform the functions and operations described herein for production control. According to one embodiment, the location of the server 505 is not important, other than being able to timely communicate with the clients to manage the functions and operations of those clients and the production process. The data storage system 605, according to one embodiment, includes both random access memory and disk storage, with the disk storage taking the form of a solid-state disk system or a magnetic storage system, or other storage system. The data storage system 605 used by the server 505 is, in one example embodiment, distributed, and include data storage located in remote systems such as a remote data center, or data storage available in the clients 330, 345, 360 and 370.

In various examples, the server 505 and its clients may communicate via one or more networks 510 or 515. A network 510 or 515 may include local-area networks (LAN), wide-area networks (WAN), wireless networks (e.g., 802.11 or cellular network), ad hoc networks, cellular, personal area networks or peer-to-peer (e.g., Bluetooth®, Wi-Fi Direct), or other combinations or permutations of network protocols and network types. A network 510 or 515 may include a single local area network (LAN) or wide-area network (WAN), or combinations of LAN's or WAN's, such as the Internet.

The data stored in the PCS 500 and for example managed by the DMS 620 can be stored in a centralized database or distributed in data tables or storage components anywhere in the PCS 500, such as both in client(s) 330 345, 360 and 370 and the server 505, or in a data storage device external to the PCS 500, such as in a remote data center (not shown). According to one example embodiment, the PCS 500 database includes data tables, and more generally, a data repository, to manage various data.

According to one example embodiment, the PCS 500 includes one or more data tables to: 1) track raw materials—substrates such as rolls of films, and laminates, and the age, location, ownership, and other attributes as may be mentioned herein, about the substrates or laminates; 2) track properties of rolls and laminates; 3) track jobs in progress; 4) track rolls as they are used at each station; 5) store warranty information about completed jobs; 6) store live information on all projects and items in production in the company, and at what station they reside; 7) store reprint information and track, if applicable, where in the production process a reprint became necessary; 8) store or create batch efficiency information that is shown in weekly reports; 9) store or create material and laminate efficiency information shown in weekly reports; 10) store or create individual project cost and material waste granular to the line item; 11) store or create material and machine usage to produce in weekly reports; and 12) store or create historical data on every job order for every customer, so output of new items can be matched to the output of old items by machine, ink set, and other relevant job order information.

According to one example embodiment, data used by the PCS 500 DMS 620 or application components 625 may be organized and stored in a variety of manners. The specific storage layout and model used may take a number of forms—indeed, it may utilize multiple models. The database may be, but is not limited to, a relational database (e.g., SQL), non-relational database (NoSQL) a flat file database, object model, document details model, graph database, or a file system hierarchy. The database may store data on one or more storage devices (e.g., a hard disk, random access memory (RAM), etc.). The storage devices may be in standalone arrays, part of one or more server 505, and may be located in one or more geographic areas.

The application components 625, in one example embodiment, comprise computer readable instructions executing in one or more of the server 505 and clients 330 345, 360 and 370, to provide: 1) computer operation to perform the functions described herein; and 2) user-interfaces, including user-interface displays and input mechanisms, to interact with users at a server 505 or client 330 345, 360 and 370, as necessary to provide the functionality described herein.

According to one example embodiment, the PCS 500 system and its data storage system 605 can store and use, as described further below: 1) base substrate data about base substrates, for example vinyl films, in the inventory or in use in production; 2) laminate data about laminates in the inventory or in use in production; 3) project data specifying one or more printing attributes of a graphic project, including the entity for whom the project is being produced; 4) printer loading data identifying a base substrate loaded in a printer 340; 5) laminating machine 355 loading data identifying a laminate loaded in a laminating machine 355; 6) "complete time" data indicating the time of completion of a printed base substrate; and 7) other data referred to herein expressly or not expressly referred to, that is required for operation of the system as described herein.

Figure 5:
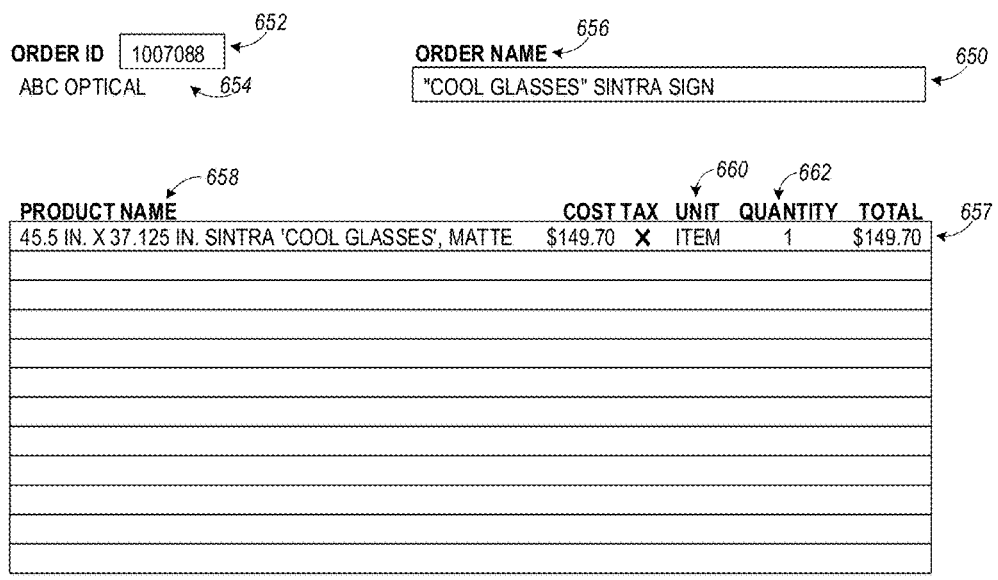
FIG. 5 illustrates an order entry screen in an interactive user-interface according to an example embodiment.
Figure 7A:
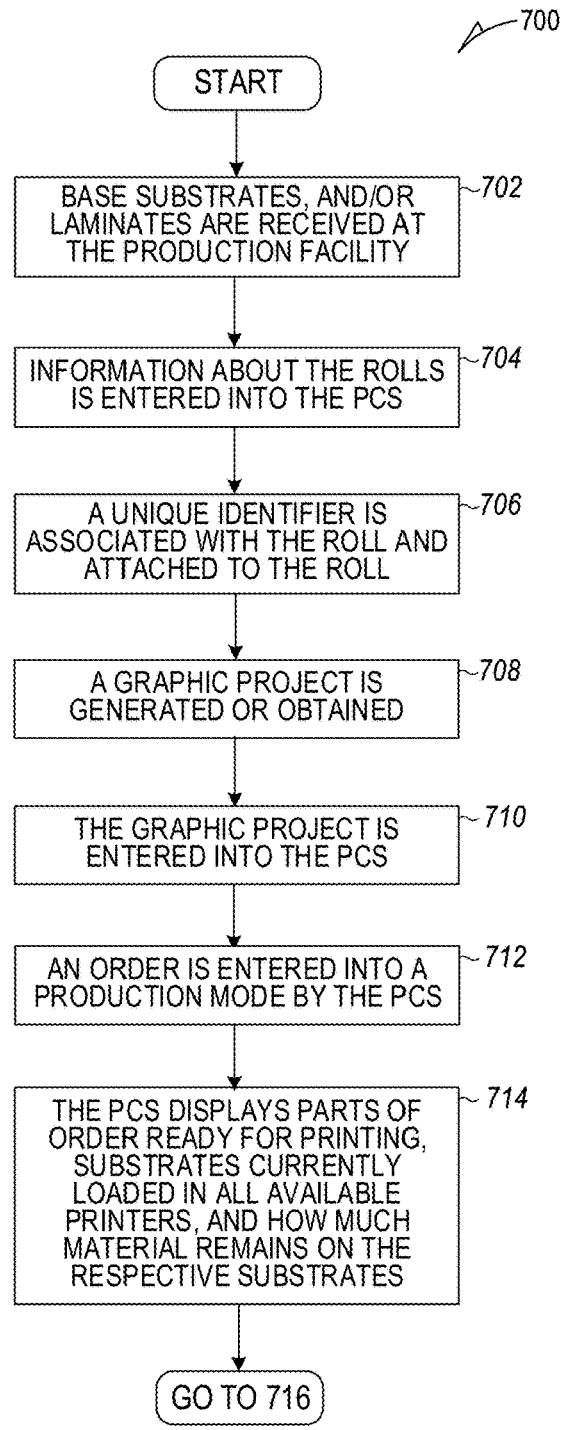
Figure 7B:
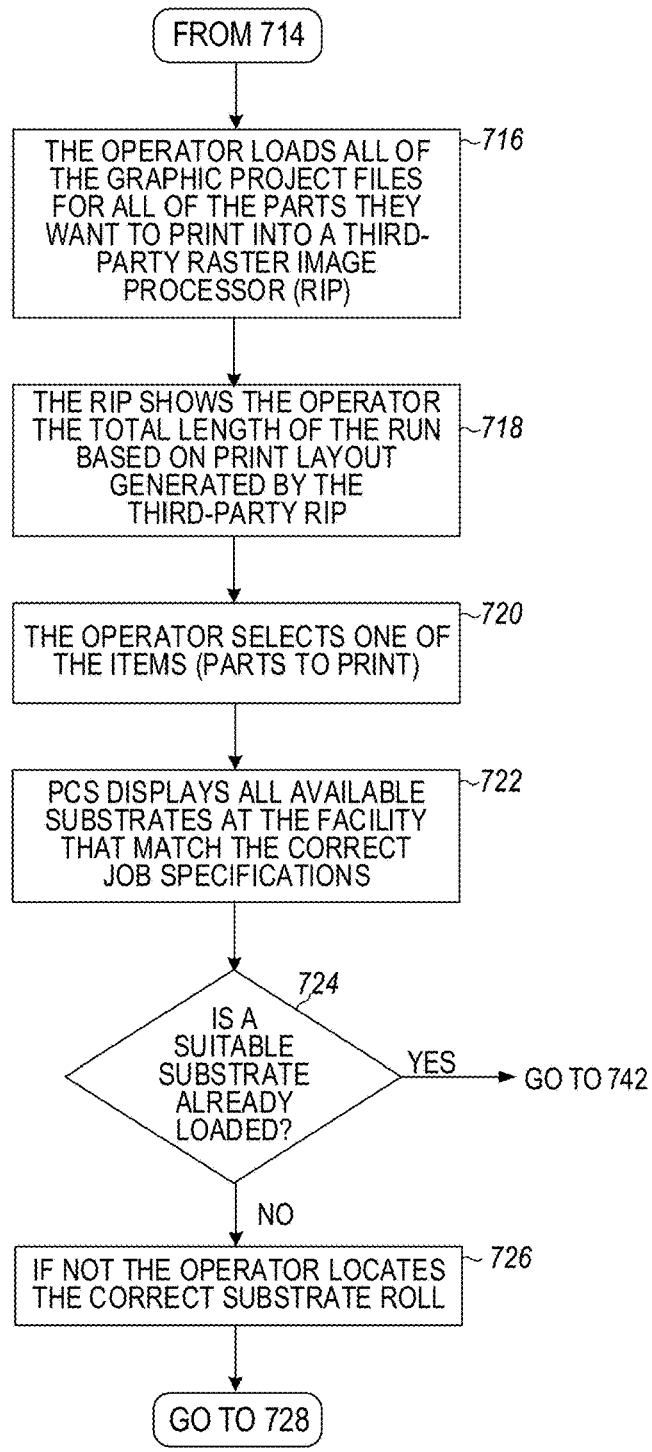
Figure 7C:
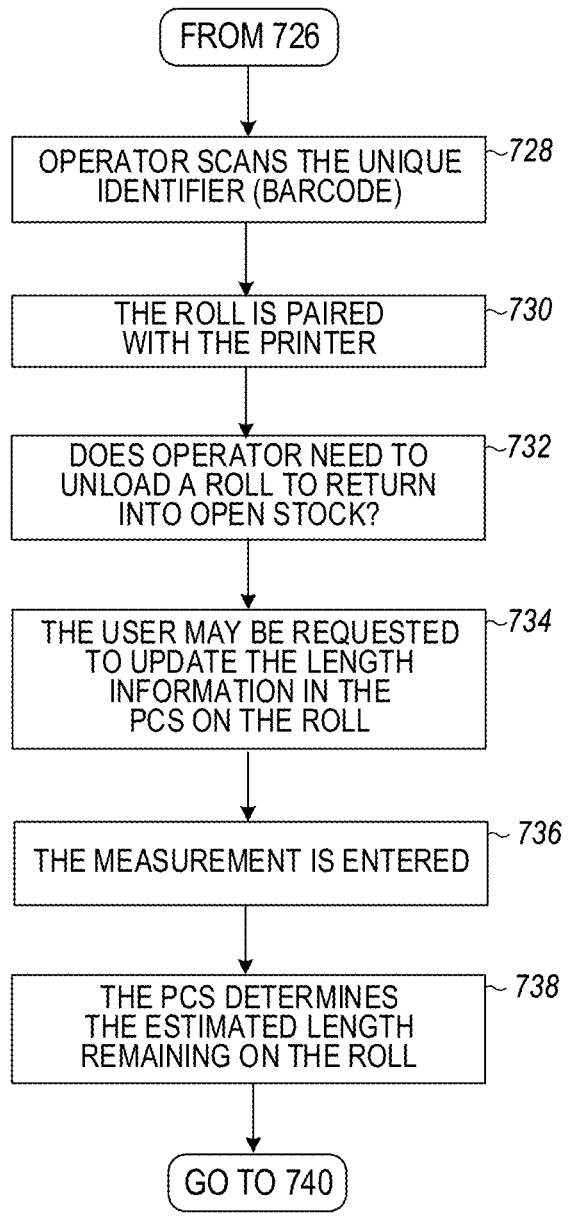
Figure 7D:
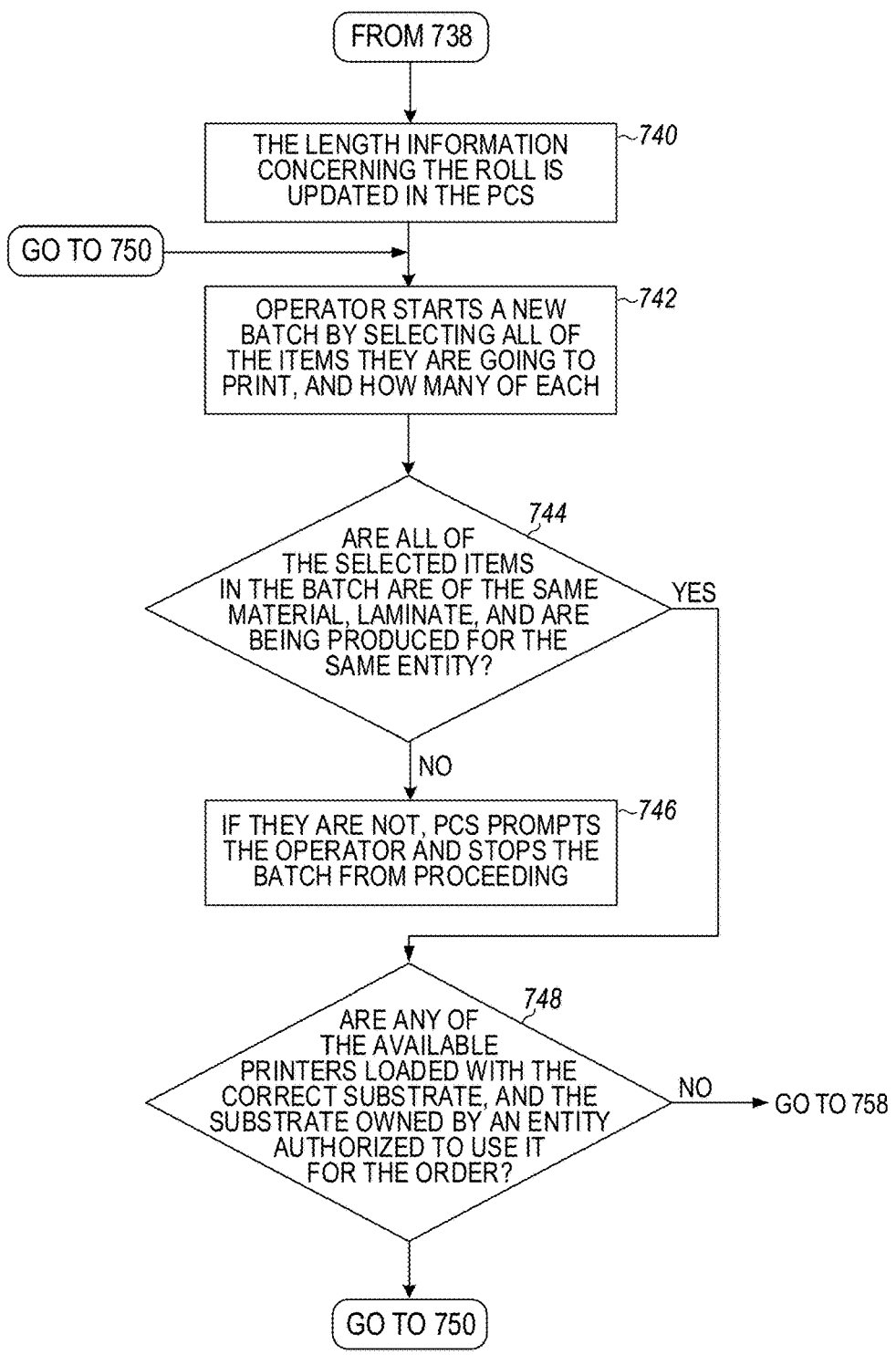
Figure 7E:
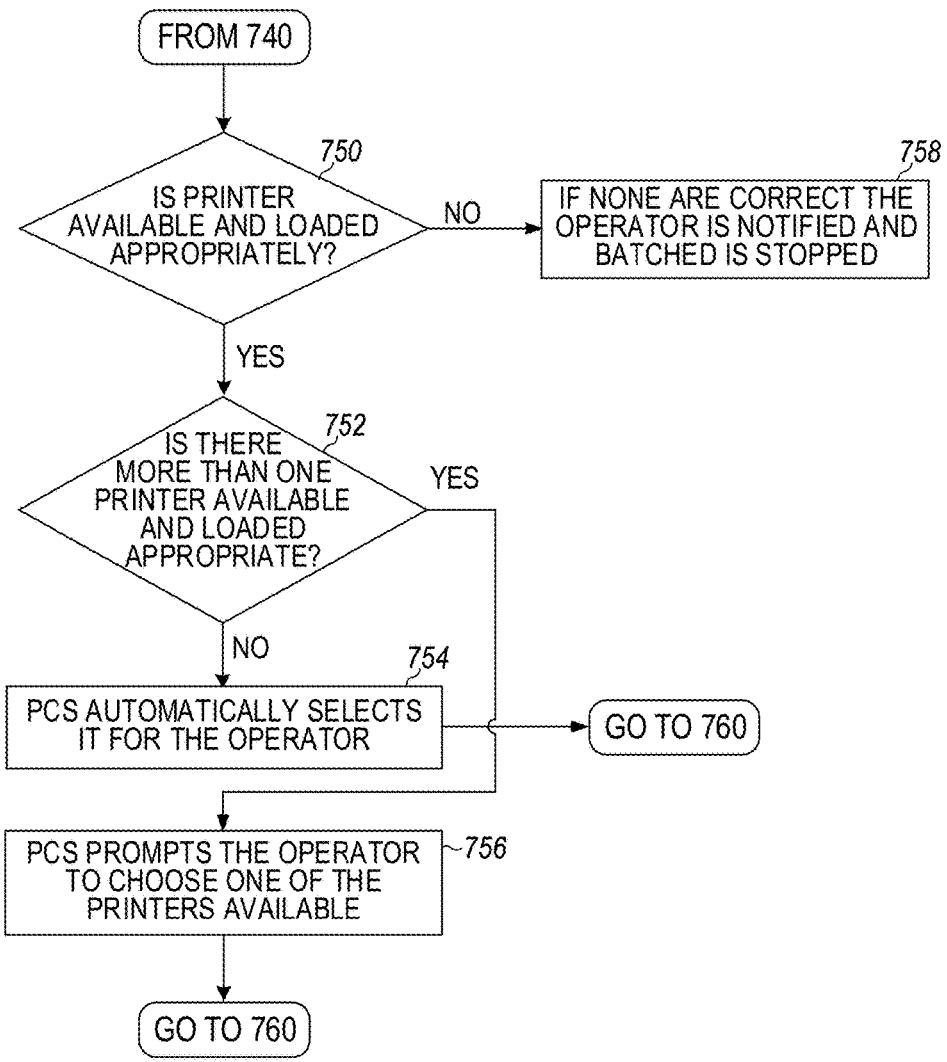
Figure 7F:
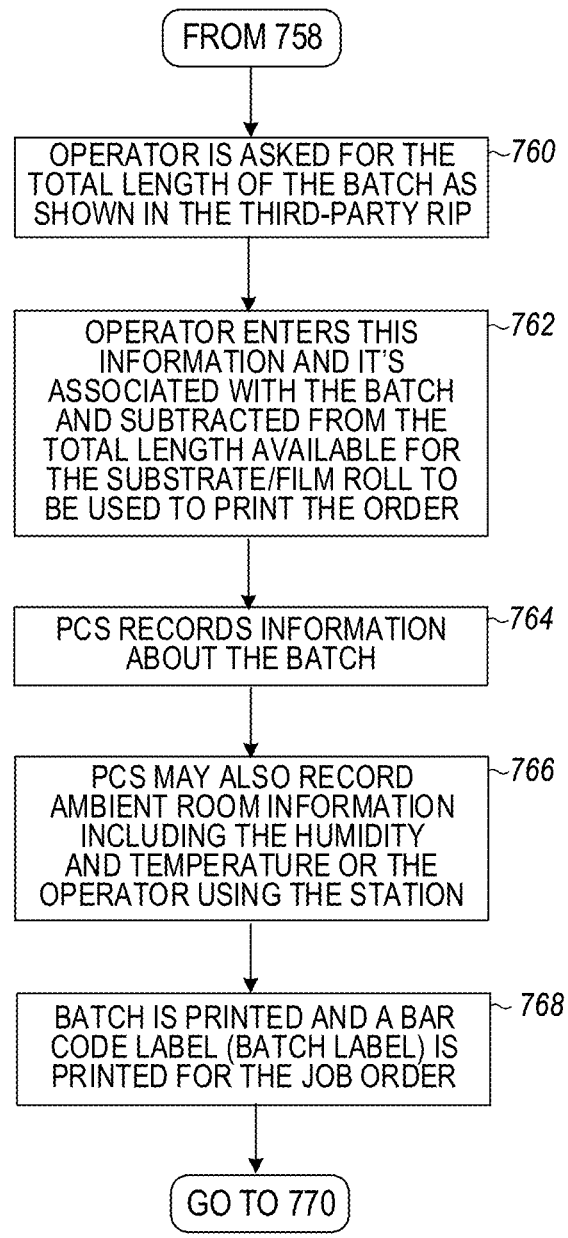
Figure 7G:
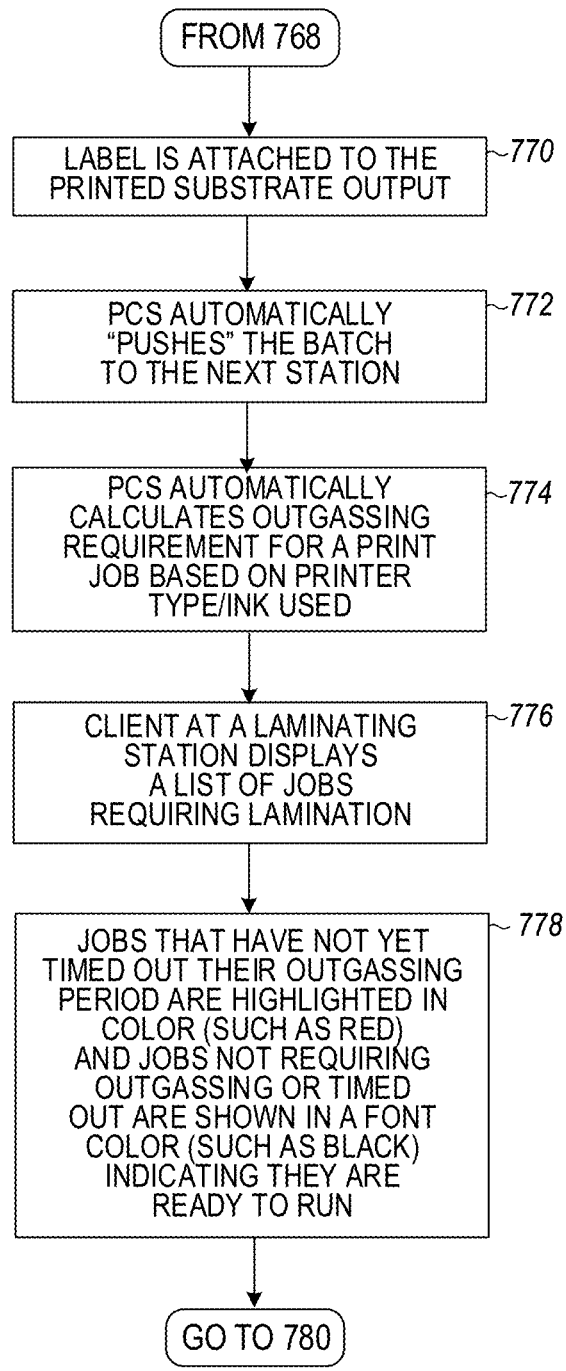
Figure 7H:
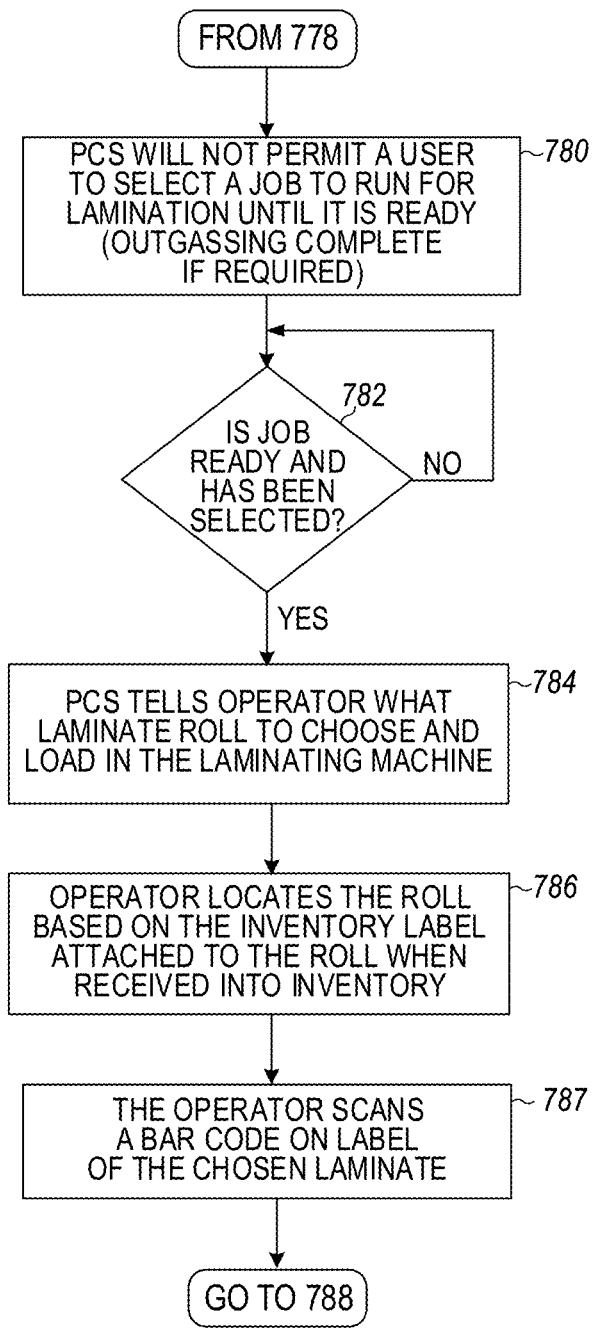
Figure 71:
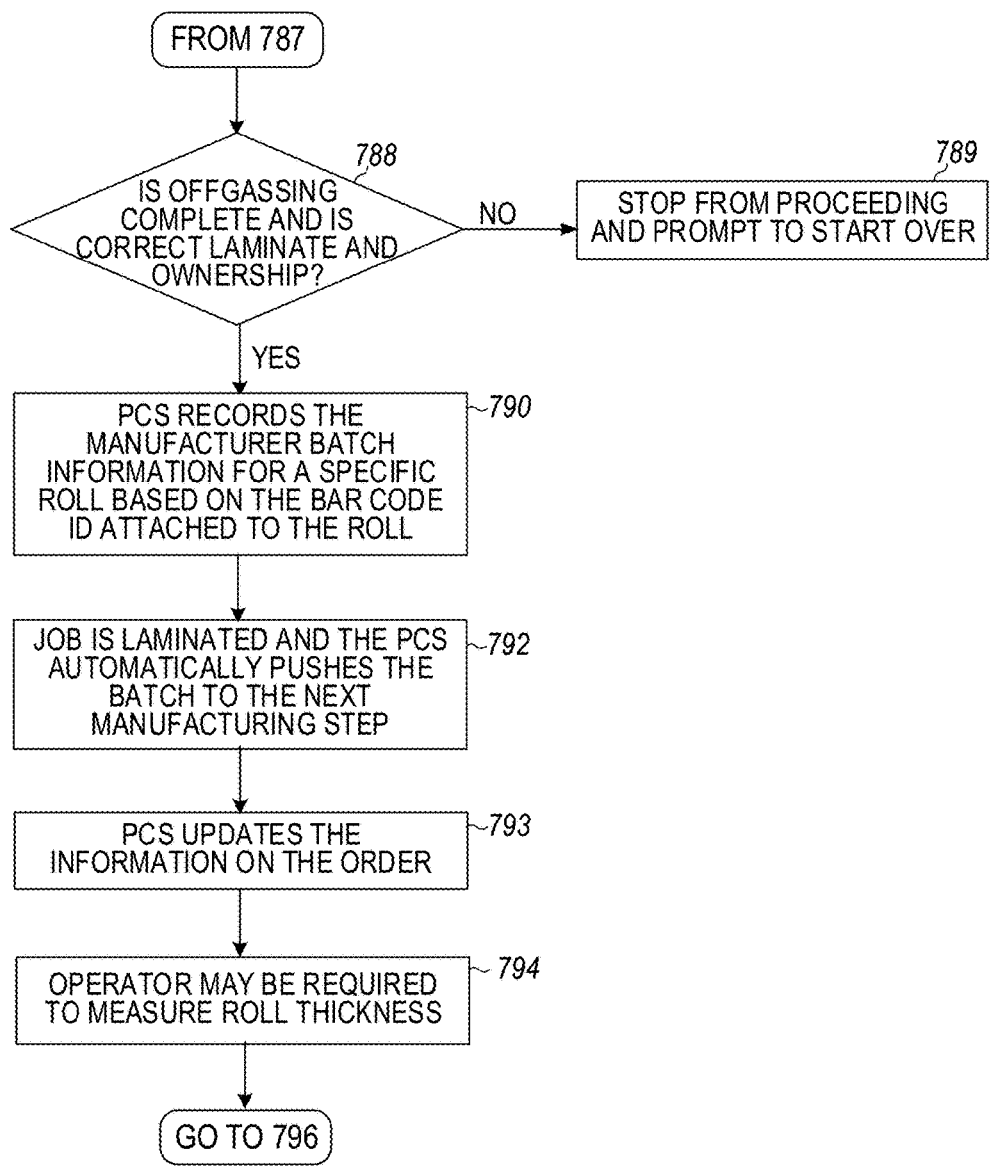
Figure 7J:
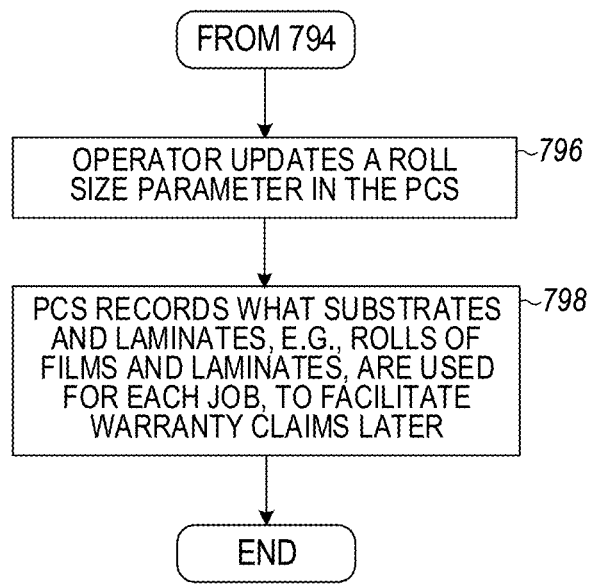

FIG. 5 illustrates an order entry screen 650 in an interactive user-interface according to an example embodiment. Screen 650 displays in a header portion of the display an order number 652, the customer name (e.g. "ABC Optical") 654, and an order name (e.g., "'Cool Glasses' Sintra Sign") 656. Line items 657 on the order are displayed below the header, with each line item including, in one embodiment, a product name 658, a unit 660 (e.g. "item"), and a quantity 662. Cost and tax information may also be displayed, but are not required for the process described herein. Although only one item is displayed in FIG. 5, multiple line items can be displayed and edited with the order entry user-interface.

FIG. 6B illustrates an order processing user-interface 670 according to an example embodiment. Interface 670 displays a list of printers 672 available at various print stations 310 as described above. Also displayed is the material (e.g. substrate/film) loaded in each respective printer (if any) and the length of the material remaining to be printed on. When the user-interface control "Ready to Print" 674 (e.g., a button) is selected, for example using a mouse input device, or by touching the button on the screen display, if a touch screen input is used, a list of job items or parts 676, also referred to as job items 682 herein, that are ready to print are displayed, with each job including a material needed (e.g. "40C"), an indication of whether or not it is "In Stock" (also a button 677), the laminate product number required to laminate the substrate, the "product name" (as shown in the order entry screen 650), the customer, the number ordered, the number printed, and the number remaining to print. According to one embodiment, a window may be displayed on the right side of the screen that shows previous batch run information if some of that job has already been run, so the operator can look up the other batch information. According to one embodiment illustrated in more detail in FIG. 6C, selecting the "In Stock" button 677 generates screen display 690, which lists 692 all the materials currently in stock in the facility that can be used to print the job in question (in this case, only one roll of substrate is shown as available in stock). In one embodiment, orders that require printing and/or laminating using a material other than the material owned or controlled by the operator are highlighted in a different color, for example red, such as the order on line 678, using the material specified as "IJ180mC-114". This order requires printing on material owned by a party other than the operator, and therefore cannot be combined with any other orders for printing, unless the other order also requires printing for the same party. If more than one party requires printing on material owned by someone other than the operator, for example on material such party owns (or controls), then a different color can be assigned to each of such parties.

FIG. 6C illustrates an order processing user-interface 680 according to an example embodiment. User-interface 680 is invoked by selecting the button "Start New Batch" 679, as for example illustrated in FIG. 6B. This interface presents a list of job items 682 to select to print together in a batch, as indicated by the message "Select Items to Print" at the top of the screen. Items selected to be printed together must require the same substrate material (e.g. roll of vinyl) and same laminate material, as they are optimally or by necessity laminated together on one operation. As illustrated, a select button 684 is provided for each job item to select that item/part for printing. According to one embodiment, the items selected are highlighted in a different color or shaded, but other means of identifying selected items may be used. As described further below with respect to FIGS. 7A-7J, once the desired batch is selected, the user selects the "Continue" button 686, and the PCS will in turn verify that the items in the selected batch are appropriate to be printed together based on the material specified for the substrate, the material for laminate, and the ownership of the substrate material and/or laminate material, based on the rules above-described. The operation of the PCS in conjunction with the use of the interfaces described in FIGS. 5, 6A, 6B and 6C is described in more detail below.

Referring now to FIGS. 7A-7J, there is illustrated the production process 700 used to produce laminated vinyl films, or more generally, laminated base substrates, according to one example embodiment. The operations of the method described below that are performed by the PCS 500 may be embodied in a set of instructions stored in at least one non-transitory storage device, and executed by one or more of the computing components (e.g., server and clients, or workstations), of the PCS 500.

Receiving of Substrates and Laminates

When new rolls of vinyl films, or more generally, base substrates, and/or laminates are received 702 at the production facility. According to one embodiment, the base substrates and/or laminates received into (and/or used in) the production facility are some cases are, owned by, and/or can only be used for, a particular entity to print one or more parts of a job order, while other base substrates and/or laminates are available to be used for any entity for whom a job is produced. The ownership of these received materials is thus tracked, as described below, so that the ownership property can be used to advantage in improving the production process.

When received (702), information about the rolls is entered 704 into the PCS 500, such as manufacturer's information that identifies the type, lot, drum, roll, batch report, and/or date of manufacture. Other information about the roll such as ownership and received state, is, in some example embodiments, also is associated with the roll, and also be entered into the PCS 500. For example, this information is entered into the PCS 500 through the client 330 at the receiving area 305. A unique identifier (for example a barcode) 340 is associated with the roll and attached 706 to the roll in any suitable fashion. This could be to the box for warehousing, inside the core after it has been opened, or using a rigid labeled mount that fits into the end of the cardboard tube supporting the substrate/film or laminate. This unique identifier travels with the substrate and laminate in the production environment and is used to identify the roll to the PCS 500, as described below.

Printing and Laminating Substrates

To initiate the production of a graphic, a graphic project is generated or obtained 708. The graphic project is entered 710 into the PCS 500, at the server 505 or one of the clients, as a production job order to be processed. Specifications for each part of the order are entered into the PCS 500 as part of the job order (also referred to herein as an "order") including materials specifications (for example, base substrate and laminate), timing, etc. When the artwork for the project has been approved and the requisite files to print the project are prepared, the order is entered into a production mode 712, so that the PCS 500 displays 714 the parts of the order ready for printing and also what substrates are currently loaded in all available printers 340, and how much material remains on the respective substrates, as for example illustrated with respect to FIG. 6A above, and in particular display area 672. According to one embodiment, this is displayed on a print station client 345. The operator next loads 716 all of the files for all of the parts they want to print into a third-party raster image processor (RIP) designed to handle many files, file types, and file sizes without limiting print capabilities. The RIP shows 718 the operator the total length of the run based on print layout generated by the third-party RIP.

Working through the user-interface 670 provided by a print station client 345, the operator selects 720 one of the items displayed in the user-interface of client 345, which causes the PCS 500 to display 722 all available substrates at the facility that match the correct job specifications, for example but not limited to: type, availability, age, ownership, and last known location to help the operator to locate it in the facility.

If 724 a suitable substrate is not already loaded in a printer 340 as indicated in display area 672, at a print station 310, the operator locates the correct substrate roll 726 and uses a scanning device 415 to scan 728 the unique identifier (barcode) into the printer 340. The scanning device 415 may be activated, for example, through a keyboard or mouse input to the PCS 500, or a switch (e.g., a trigger). The roll is paired 730 with the printer 340 in the PCS 500 database, and associated with that machine, including ink type and any other pertinent attributes. According to another example embodiment, if there are more printers, a swap button is provided to specify printers that are live in the system, so multiple print stations can be configured to run different sets of machines, or just swap in machines as they are needed on one terminal.

The user may also need to unload a roll in this process to return into open stock. If 732 this is required, the user may be requested 734 to update the length information in the PCS 500 on the roll, when it is removed from the printer 340. For example, the operator may be prompted to measure the thickness of the roll to verify the remaining length. This is, according to one embodiment, done with a caliper. The measurement is entered 736 by the operator into the PCS 500. The PCS 500 in turn uses the measurement to determine 738 the estimated length remaining on the roll, to update 740 the length information concerning the roll in the PCS 500.

Once a printer, loaded (as paired in PCS 500) with a particular substrate, is available, the operator starts the printing of a new batch of graphic parts by selecting 740 (from the list displayed) all of the items 682 they intend to print, and how many of each, using the user-interface 680 at the print station client 345. According to one embodiment, the items 682 presented at the user-interface for the operator to select may be from more than one job order, such that the operator can choose one or more items that need to be printed from a first job order, and one or more items that need to be printed from a different job order, to all be printed in a batch. The PCS 500 then verifies 742 that all of the selected items in the batch can be printed on the same material (i.e., the same roll of film where the required material is a film roll), based on the technical requirements of the respective items, and, in one example embodiment, based on the owner of the material. As noted above with respect to FIG. 6B, items requiring printing on materials other than those owned (or controlled) by the operator are, in one example embodiment, highlighted, so that the operator can avoid batching together items requiring printing from materials not having matching ownership, or at least not incompatible ownership. Both the technical and ownership requirements of the substrate and laminate are taken into account separately in this verification process, as all the items printed on the same substrate will, later in the production process, be laminated together.

For example, if one of the items selected can only be printed on a material owned by the operator of the production facility, and another of the items selected can only be printed on a material owned by an entity other than the operator of the production facility, the PCS 500 will prompt 744 the operator and stops the batch from proceeding—i.e., will not allow the selected items to be printed in the same batch, on the same material. However, if all items can be printed on the same material because there is no ownership conflict, the batch is allowed to proceed. Alternatively, according to another example embodiment, the user-interface can restrict the items offered to the operator to choose so that only items that can be printed in together in a single batch are presented. Accordingly, an important advantage of the process 700 is being able to batch many different customer order parts into batches to optimize use of material, and in this instance, substrates (e.g., films) and laminates.

The PCS 500 then checks 748 all of the available printers 340 to see if any are loaded with the correct substrate, and the substrate is owned by an entity authorized to use it for the order. If 750 a printer 340 is available and loaded appropriately, the PCS 500 determines if 752 there is more than one. If only one, the PCS automatically selects 754 it for the operator. If there are many it will prompt 756 the operator to choose one. If none are correct it will notify 758 the operator and stop the batch from proceeding.

The client 345 will then ask 760 the operator for the total length of the batch as shown in the third-party RIP. The operator enters 762 this information and it associated with the batch and subtracted from the total length available for the substrate/film roll.

The PCS 500 records 764 information about the batch including all of the items in the batch, the unique roll it was printed on, the length of the run, the specified laminate if it needs one, the date and time it was run, the machine it was run on and the type of ink of that machine. It may also record 766 ambient room information including the humidity and temperature or the operator using the station.

The batch is printed 768 and a bar code label (batch label) is printed for the job order, and is attached 770 to the printed substrate output by the operator. The batch label (not shown) shows relevant batch information including time/date it was run, what the next station the batch needs to go to is, customer, and item information.

Next, the PCS 500 automatically "pushes" 772 the batch to the next station, and in particular, a laminating station 315. At the laminating station 315, the PCS 500 automatically calculates 774 outgassing requirement for a print job based on printer type/ink used.

The client 360 at a laminating station 315 displays 776 a list of jobs requiring lamination, presented on the user-interface for client 360. Jobs that have not yet timed out their outgassing period are highlighted 778 on the user-interface, for example by listing the job using a font of a different color (such as red) than jobs ready to run. Jobs not requiring outgassing or timed out are shown in a font color (such as black) indicating they are ready to run. Although displayed, the PCS 500 will not permit 780 a user to select a job to run for lamination until it is ready (outgassing complete if required). If 782 a job is ready and has been selected, the PCS 500 tells 784 the operator what laminate rolls are available to choose based on the order data and load in the laminating machine 355. The operator locates 786 the roll based on the inventory label attached to the roll when received into inventory. The operator then scans 787 a bar code on label of the chosen laminate, using a scanning device 415 at the station. The PCS 500 verifies 788 offgassing is complete, the laminate chosen matches the order specification and the ownership also matches the order. If any of these criteria are incorrect the PCS 500 stops 789 the operator from proceeding and they are prompted to start the process over. If everything matches, the PCS 500 records 790 the manufacturer batch information for a specific roll based on the bar code ID attached to the roll when received in inventory, as described above. The PCS 500 subtracts the batch length from the laminate roll to update available inventory status. Once the operator has laminated 792 the job, the PCS 500 automatically pushes the batch to the next manufacturing step, such as to the cutting station, and updates 793 the information on the order. When unloading the laminator, the operator may be required to measure 794 roll thickness using, for example, a caliper, and update 796 a roll size (remaining length) parameter in the PCS 500.

According to one example embodiment, following or prior to the laminating operation, the PCS 500 records 798 what substrates and laminates, e.g., rolls of films and laminates, are used for each job, to facilitate warranty claims later. This includes, in one embodiment: 1) unique material roll information, including all jobs and items that came from the roll; 2) unique laminate roll information, including all jobs and items that came from the roll; 3) offgassing information, including what type of ink was used, the outgassing process, lamination date, etc.; and 4) printer and inkset information.

According to another example embodiment, the PCS 500 receives environment condition information such as temperature and humidity in the production facility, and further includes one or more computer programs operable on the processor to stores into the data storage system 605, in one or more data tables, environment data representative of such environmental conditions in the production facility at the time of printing of the one or more parts of the graphic project.

According to still another example embodiment, the PCS 500 further includes one or more computer programs operable on the processor to store in the data storage, in one or more data tables, data identifying which particular roll of base substrate, from inventory, that was used to print one or more parts of graphic projects printed in the facility. This stored data is used for future reference for warranty purposes and for generation of production reports and analytics. The PCS 500 further includes one or more computer programs operable on a the processor to retrieve data specifying what particular roll of substrate and/or laminate in inventory was used to, respectively, print and/or laminate a project part previously printed in the production facility, and also, in one example embodiment, environmental data specifying at least some environmental conditions present in the facility when the respective project part was printed.

Example Computer System

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server 505 computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configure each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 8:
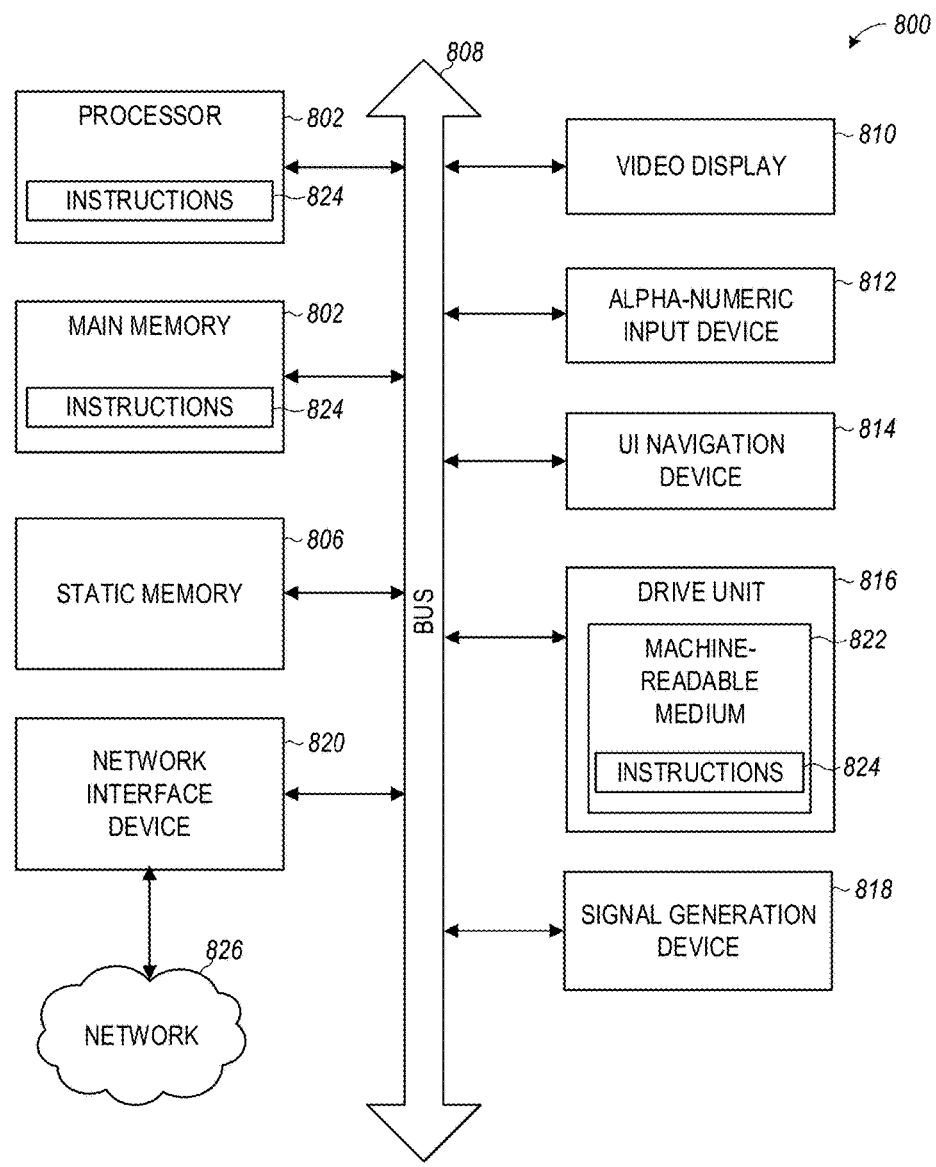
FIG. 8 is a block diagram illustrating an example machine upon which any one or more of the computer techniques (e.g., methodologies) discussed herein may be performed, according to an example embodiment.

FIG. 8 is a block diagram illustrating a machine in the example form of a computer system 800, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server 505 or a client machine in server 505-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 may further include a video display unit 810, an alphanumeric input device 812 (e.g., a keyboard), and a user interface (user-interface) navigation device 814 (e.g., a mouse). In one embodiment, the video display unit 810, input device 812 and user-interface navigation device 814 are incorporated into a touch screen display. The computer system 800 may additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" may include a single medium or multiple media (e.g., a centralized or distributed database, and/or associated caches and server 505) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 824 may further be transmitted or received over a communications network 826 using a transmission medium via the network interface device 820 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method performed in a production facility including an inventory of substrates and laminates used in the production of graphics, the production facility further including at least one printer and at least one laminating machine, comprising:
    receiving a base substrate at the production facility and introducing base substrate inventory data, regarding the received base substrate, into a data storage system;
    attaching to the received base substrate a base substrate identification label including a machine-readable code;
    receiving a laminate at the production facility and introducing laminate inventory data, regarding the received laminate, into the data storage system;
    attaching to the received laminate a laminate identification label including a machine-readable code;
    introducing project data into the into the data storage system, the project data specifying one or more base substrate and/or laminate requirements of a graphic project;
    scanning the machine-readable code on the base substrate identification label to introduce printer loading data into the data storage system, and loading the base substrate into the printer to prepare to print on the base substrate;
    scanning the machine-readable code on the laminate identification label to introduce laminating machine loading data into the data storage system, and loading the laminate into the laminating machine;
    wherein the printer loading data identifies the base substrate loaded in the printer at a particular time, and the laminating machine loading data identifies the laminate loaded in the laminating machine at a particular time;

using at least a portion of the base substrate data, printer loading data and/or project data introduced into the data storage system, determining if the printer is presently loaded with a base substrate suitable in type and remaining length to print at least one part of the graphic project;

if it is determined that the printer is presently loaded with a base substrate suitable in type and length, printing the at least one part of the graphic project on the printer to produce a printed base substrate for the at least one part;

introducing to the data storage system data specifying a complete time indicating the time of completing the printing of the printed base substrate;

automatically accessing the data storage system and using at least a portion of the laminate data, laminating machine loading data and/or project data, to determine if the laminating machine is presently loaded with a laminate suitable in type and remaining length to laminate the at least one part of printed base substrate;

automatically accessing the data storage system and using the complete time data and at least a portion of the base substrate data associated with the printed base substrate, to determine if enough time has elapsed since the complete time in order to initiate lamination of the printed base substrate; and wherein the project data introduced to the data storage system includes data concerning at least two different projects for two different respective entities, and further wherein each project includes at least one part to print for its respective entity, and further wherein at least one part from each respective project is displayed for the operator to select, and the operator selects at least one part from one of the projects and at least one part from the other of the projects to print together in one batch.

2. A method according to claim 1 further including if it is determined that the printer is not presently loaded with a base substrate suitable in type and length, determining if another base substrate in inventory is suitable in type and length to print the at least one part of the two different graphic projects, and generating human readable output based on the determination.

3. A method according to claim 2 further including if it is determined that the laminating machine is not presently loaded with a laminate suitable in type and length, determining if another laminate in inventory is suitable in type and length to laminate the at least one part of the two different graphic projects, and generating human-readable output based on the determination.

4. A method according to claim 3 further including generating a human readable indication if enough time has passed since the printing of the at least one parts on the base substrate to allow for outgassing.

5. A method according to claim 1 further including receiving into the data storage system a measurement taken from a base substrate, the measurement being proportional to a length of the base substrate.

6. A method according to claim 1 further including introducing owner data into the data storage system, the owner data specifying an owner of the base substrate and/or an owner of the laminate, and further including accessing the data storage system to automatically determine if the base substrate and/or the laminate is authorized to be used to print and/or laminate the graphic project based on the entity that owns the base substrate and that owns the laminate.

7. A method according to claim 1 further including introducing into the data storage system environment data representative of at least one environmental condition in the production facility at the time of printing of the one or more parts of the graphic project.

8. A method according to claim 1 further including, in the data storage system, associating the printing and/or laminating of at least one part of a graphic project with data concerning the base substrate and/or laminate used to produce the graphic project.

9. A process according to claim 8 further including the data concerning the base substrate and/or laminate used to produce at least one part of the graphic project is accessed to determine a particular roll of base substrate that was used to print the at least one part of the graphic project, and further including retrieving data specifying how the at least one project part was processed, wherein data useful for determining a warranty claim is made available.

10. A method according to claim 1 further including a scanner at the printer and a scanner at the laminating machine, wherein the scanners are used to scan the machine readable code of the base substrate label and laminate label, respectively, to identify the base substrate and laminate used at the printer and laminating machine, respectively.

11. A method according to claim 1 wherein the production facility comprises a contiguous area of building, or more than one non-contiguous areas of one or more buildings.

12. A production control system for use in a production facility including an inventory of base substrates and laminates used in the production of graphics, the production facility further including at least one printer and at least one laminating machine, comprising:

a data storage system including data tables to store:
base substrate data about the inventory of base substrates;
laminate data about the inventory of laminates;
project data specifying one or more printing attributes of a graphic project;
printer loading data identifying a base substrate loaded in a printer;
laminating machine loading data identifying a laminate loaded in a laminating machine;
complete time data indicating the time of completion of a printed base substrate;
a processor and computer readable instructions accessing at least a portion of the data stored in the data storage system to:
identify a printer in the production facility that is capable to print a graphic project;
identify a laminating machine in a production facility that is capable to laminate a graphic project;
determine if a printer in the production facility is presently loaded with a base substrate suitable in type and remaining length to print the graphic project to produce a printed base substrate, the printed base substrate having a time of completion;
determine if a laminating machine in the production facility is presently loaded with a laminate suitable in type and remaining length to laminate the printed base substrate; and
determine if enough time has elapsed since a complete time in order to initiate lamination of a printed base substrate.

13. A production control system according to claim 12 wherein the project data stored in the data storage system includes data concerning at least two different projects for two different respective entities, and further wherein each project includes at least one part to print for its respective entity, and further wherein the processor and computer readable instructions access at least a portion of the data stored in the data storage system to display to an operator at least one part from each respective project for the operator to select, to enable the operator to select at least one part from one of the projects and at least one part from the other of the projects to print together in one batch.

14. A production control system according to claim 12 further wherein the processor and computer readable instructions access at least a portion of the data stored in the data storage system to determine if the printer is not presently loaded with a base substrate suitable in type and length, determine if another base substrate in inventory is suitable in type and length to print the at least one part of the two different graphic projects, and generate human readable output based on the determination.

15. A production control system according to claim 12 further wherein the processor and computer readable instructions access at least a portion of the data stored in the data storage system to determine if the laminating machine is not presently loaded with a laminate suitable in type and length, determine if another laminate in inventory is suitable in type and length to laminate the at least one part of the two different graphic projects, and generate human readable output based on the determination.

16. A production control system according to claim 15 further wherein the processor and computer readable instructions access at least a portion of the data stored in the data storage system to produce a human readable indication if enough time has passed since the printing of the at least one parts on the base substrate to allow for outgassing.

17. A production control system according to claim 12 further wherein the processor and computer readable instructions access at least a portion of the data stored in the data storage system to receive into the data storage system a measurement taken from a base substrate, the measurement being proportional to a length of the base substrate.

18. A production control system for use in a production facility including an inventory of base substrates and laminates used in the production of graphics, comprising:
   a data storage system including data tables to store:
      base substrate data about an inventory of base substrates available to print parts of a graphic project;
      laminate data about an inventory of laminates available to laminate parts of a graphic project;
      project data specifying one or more parts of one or more respective graphics projects printed in the production facility;
   a processor and computer readable instructions accessing at least a portion of the data stored in the data storage system to:
      record data in the data storage system to identify a particular roll of one of the base substrates in the inventory that was used to print one or more parts of the graphic project; and
      retrieve data specifying one or more project parts that were printed on the particular roll of substrate in the inventory, whereby warranty claim data is recorded and accessed for projects printed using the production control system.

19. A production control system according to claim 18 further comprising the processor and computer readable instructions to receive and store environment data representative of at least one environmental condition in the production facility at the time of printing of the one or more parts of the graphic project.

20. A production control system according to claim 18 further wherein the processor and computer readable instructions are further operable to store and retrieve, for warranty or other purposes:
   unique base substrate roll information, including all jobs and items that came from the roll;
   unique laminate roll information, including all jobs and items that came from the roll;
   offgassing information, including information on what type of ink was used, information on the outgassing process, and information on the lamination date; and
   printer and inkset information.

* * * * *